US006883014B1

(12) United States Patent
McErlean

(10) Patent No.: US 6,883,014 B1
(45) Date of Patent: Apr. 19, 2005

(54) ELECTRONIC MESSAGE DISTRIBUTION

(75) Inventor: Patrick McErlean, Northern Ireland (GB)

(73) Assignee: Amacis Limited (GB)

( * ) Notice: Subject to any disclaimer, the term of this patent is extended or adjusted under 35 U.S.C. 154(b) by 885 days.

(21) Appl. No.: 09/691,936

(22) Filed: Oct. 19, 2000

(51) Int. Cl.[7] .................................................. G06F 15/16

(52) U.S. Cl. .......................... 709/202; 709/206; 707/10

(58) Field of Search ................................ 709/200–207; 707/2–6, 10

(56) References Cited

U.S. PATENT DOCUMENTS

| | | | | |
|---|---|---|---|---|
| 5,459,717 A | * | 10/1995 | Mullan et al. | 370/351 |
| 5,574,903 A | * | 11/1996 | Szymanski et al. | 707/9 |
| 5,577,202 A | * | 11/1996 | Padgett | 709/206 |
| 5,765,033 A | | 6/1998 | Miloslavsky | |
| 5,928,325 A | * | 7/1999 | Shaughnessy et al. | 709/206 |
| 5,978,836 A | | 11/1999 | Ouchi | |
| 6,021,427 A | | 2/2000 | Spagna et al. | |
| 6,026,396 A | * | 2/2000 | Hall | 707/4 |
| 6,044,395 A | | 3/2000 | Costales et al. | |
| 6,058,435 A | * | 5/2000 | Sassin et al. | 709/331 |
| 6,076,101 A | | 6/2000 | Kamakura et al. | |
| 6,128,646 A | * | 10/2000 | Miloslavsky | 709/206 |
| 6,161,130 A | | 12/2000 | Horvitz et al. | |
| 6,182,059 B1 | * | 1/2001 | Angotti et al. | 706/45 |
| 6,219,691 B1 | | 4/2001 | Youn | |
| 6,249,807 B1 | * | 6/2001 | Shaw et al. | 709/206 |
| 6,338,081 B1 | * | 1/2002 | Furusawa et al. | 709/202 |
| 6,356,633 B1 | * | 3/2002 | Armstrong | 379/265.11 |
| 6,385,619 B1 | | 5/2002 | Eichstaedt et al. | |
| 6,389,132 B1 | * | 5/2002 | Price | 379/265.01 |
| 6,417,930 B1 | | 7/2002 | Mori | |
| 6,424,997 B1 | | 7/2002 | Buskirk, Jr. et al. | |
| 6,442,592 B1 | | 8/2002 | Alumbaugh et al. | |
| 6,477,551 B1 | | 11/2002 | Johnson et al. | |
| 6,493,695 B1 | * | 12/2002 | Pickering et al. | 706/47 |
| 6,519,617 B1 | | 2/2003 | Wanderski et al. | |
| 6,571,225 B1 | | 5/2003 | Oles et al. | |
| 6,606,649 B1 | | 8/2003 | Schwitters et al. | |
| 6,629,130 B1 | | 9/2003 | Mertama et al. | |
| 6,654,735 B1 | | 11/2003 | Eichstaedt et al. | |
| 6,691,151 B1 | * | 2/2004 | Cheyer et al. | 709/202 |
| 6,760,753 B1 | | 7/2004 | Ohgushi et al. | |
| 6,769,014 B1 | * | 7/2004 | Chang et al. | 709/206 |
| 6,801,936 B1 | * | 10/2004 | Diwan | 709/202 |

* cited by examiner

*Primary Examiner*—Marc D. Thompson
(74) *Attorney, Agent, or Firm*—RatnerPrestia

(57) ABSTRACT

The invention relates to the distribution of electronic messages which fall within one or more message classes or categories. One aspect of the invention provides an electronic message distributing apparatus for distributing electronic messages from a database to one or more agents, the database storing, in respect of each electronic message to be distributes, a set of one or more message classes into which the message is deemed to belong. The apparatus causes the message to be rendered to one or more agents in succession, each having the capability to deal with one or more of the message classes in said set, until the message is processed in respect of all message classes for which there is a capable agent. The invention removes the onus on individual agents to forward messages to other agents if they cannot deal with all aspects of a message themselves. This reduces the likelihood that an inadequate response is sent to the customer.

30 Claims, 7 Drawing Sheets

ELECTRONIC MESSAGE DISTRIBUTION

FIELD OF THE INVENTION

The present invention relates to electronic message distribution. The invention relates particularly to the distribution of electronic messages which may fall within more than one different message classes or categories.

BACKGROUND TO THE INVENTION

Many organisations are now equipped to receive messages, including orders and enquiries, by electronic means. Typically, such electronic messages take the form of text-based messages, for example e-mails, delivered by a global computer network, for example the Internet, or by a telecommunications network, for example a mobile telephone network. Each message must be processed and dealt with appropriately i.e. according to the nature of the message. In many cases, the volume of received electronic messages is relatively high and it is considered inefficient to process each message manually.

For this reason, it is known for electronic message processing systems, typically in the form of a computer system, to employ a text analyzer, such as IBM's Mail Analyzer, to analyse the content of electronic messages in order to classify, or categorize, each message according to its content. Once a message has been categorized, the processing system sends it on to a human agent who has the skills necessary to deal with messages falling within the relevant category(s). Alternatively, the computer system itself may be able to deal with messages falling within certain category(s).

Typically, a text analyzer examines the text of each message in turn in search of one or more alphanumeric text string, for example a word or sequence of words, which may be used to identify the purpose or nature of the message under examination. Normally the text analyzer operates in association with a rule engine to apply a set of rules to the message in order to determine how to categorize the current message.

By way of simplistic example, a banking organisation may have a message processing system arranged to receive electronic messages in three different categories, namely: balance enquiry; request for funds transfer; and interest rate enquiry. In order to categorize each received message, a text analyzer in association with a rule engine applies a set of four rules to each message in turn. The first rule stipulates that if the text string "balance" appears in the message, then the message falls in the balance enquiry category. The second rule stipulates that if the text strings "funds" and "transfer" appear in the message, then the message falls in the funds transfer category. The third rule stipulates that if the message contains the text string "interest rate", then the message should be categorized as an interest rate enquiry. The fourth rule stipulates that if none of the previous rules are satisfied, then the message is deemed unclassified.

Clearly, a message may fall within more than one category.

For this reason, some conventional text and analyzers, including the IBM mail analyzer are capable of generating a set of more than one categories in which a given message is deemed to fall. Further, such text analyzers normally associate with each category in the set an indication of the level of confidence with which the text analyzer has determined that the message falls within that category. Typically, the confidence level is expressed as a percentage.

Once categorization is complete, the message has to be distributed to a human agent, or a computer (automated) agent, that is capable of dealing with messages falling within the relevant category or categories. There is a problem, however, in that an agent may not have the capability to deal with all of the categories into which a given message falls. This is particularly true for large organisations which may receive messages falling in one or more of tens or even hundreds of categories, and where each agent employed by the organisation is only trained to deal with a subset of those categories.

Conventionally, an e-mail processing system includes a distributor which is arranged to determine which category has been assigned to a given message with the highest confidence level. The distributor then selects an agent that is capable of dealing with said category and forwards the message on to him (or it).

Upon receipt of the message, the agent duly deals with those aspects of the message that he can. If a message includes further aspects which fall within a category or categories that the agent cannot deal with, the onus is on the agent to recognise this and to forward the message, together with the part-response that the agent was able to prepare, to another agent who does have the capability to deal with one or more of the outstanding categories.

This is problematic since the agent may not recognise that there are other aspects of the message which require attention or may simply fail to forward the message on to another agent. This can result in a response being returned to the customer (from which the message emanated) which only partly deals with the various orders or requests made in the message. This can be frustrating to the customer and damaging to the organisation as it may result in loss of business.

SUMMARY OF THE INVENTION

In accordance with a first aspect of the present invention there is provided an electronic message distributing apparatus for distributing electronic messages from a database to one or more agents, the database storing, in respect of each electronic message to be distributed, a set of one or more message classes into which the respective electronic message is deemed to belong, the distributing apparatus comprising: means for determining, from said database, at least one message class in which an electronic message is deemed to belong; means for selecting, from a directory of one or more agents, an agent that has a capability to process electronic messages that belong to said at least one message class; means for causing said electronic message to be rendered to said selected agent for processing thereby; and means for receiving from said selected agent a signal indicating that said electronic message is processed; wherein, upon receipt of said signal, the distributing apparatus is arranged to determine, from said database, if said set includes one or more message classes in respect of which said electronic message is not processed and, in response to determining that said electronic message has not been processed in respect one or more message classes in said set, is arranged to select a further agent to which to cause said electronic message to be rendered, which further agent has a capability to process messages which belong to one or more of said unprocessed message classes.

Thus, the distributing apparatus of the present invention ensures that a given electronic message which falls within multiple message classes is dealt with, or processed, in respect of all of said class es for which there is a capable agent. The distributing apparatus distributes a message to a plurality of agents if necessary until it determines that all aspects of the message which can be dealt with, are dealt with. The onus on the agent to forward the message to other agents is removed. Hence, the likelihood that an inadequate reply message will be sent to a customer is greatly reduced.

In a preferred embodiment of the invention, each message class comprises a respective message group, each message group comprising one or more message categories. It is preferred to define one or more basic message categories into groups as this simplifies the distribution process.

More preferably, it is assumed that when a message is sent to a particular agent in respect of a particular message class, or group, that the agent also deals with any other aspects of the message which fall into classes or groups which the agent is capable of dealing with.

A second aspect of the invention provides an electronic message processing system for distributing electronic messages amongst a plurality of agents, the system comprising:

a database arranged to store, in respect of each electronic message to be distributed, a set of one or more message classes into which the respective electronic message is deemed to belong; and a directory of one or more agents, said directory including, in respect of each agent, a set of one or more message classes in respect of which the respective agent has a capability of dealing with electronic messages;

a distributing apparatus arranged to distribute electronic messages to one or more of said agents, the distributing apparatus comprising:

means for determining, from said database, at least one message class in which an electronic message is deemed to belong;

means for selecting, from said directory, an agent that has a capability to process electronic messages that belong to said at least one message class;

means for causing said electronic message to be rendered to said selected agent for processing thereby; and means for receiving from said selected agent a signal indicating that said electronic message is processed;

wherein, upon receipt of said signal, the distributing apparatus is arranged to determine, from said database, if said set includes one or more message classes in respect of which said electronic message is not processed and, in response to determining that said electronic message has not been processed in respect one or more message classes in said set, is arranged to select a further agent to which to cause said electronic message to be rendered, which further agent has a capability to process messages which belong to one or more of said unprocessed message classes.

In a preferred embodiment, the database includes a first set of data records each data record including means for identifying the respective message to which it relates and means for identifying a respective message class in which said respective message is deemed to belong. The first set of data records, which hereinafter is referred to as a workflow table, serves as a list of all electronic messages which have been received by the electronic message system and which have undergone classification. Preferably, each data record includes a status identifier for indicating whether or not the electronic message to which said data record relates has been processed in respect of the message classification noted in the data record.

Preferably still, all data records which relate to the same electronic message, are prioritised with respect to one another. Further preferably, the prioritisation is determined on the basis of the level of confidence with which the electronic message is classified into the respective message classes.

Preferably, the system includes a second set of data records, each data record in the second set also including means for identifying the respective message to which it relates and means for identifying a respective message class to which said respective message is deemed to belong. The second set of data records, hereinafter referred to as the distributor control table, serves as a list of electronic messages or part-messages, which are awaiting distribution by the distribution apparatus.

A third aspect of the invention provides a method of processing electronic messages in the electronic message processing system of the second aspect of the invention.

A fourth aspect of the invention provides a computer program product comprising computer program code stored on a computer usable storage medium for performing the method of the third aspect of the invention.

Other aspects of the present invention will become apparent to those ordinarily skilled in the art upon review of the following description of a specific embodiment of the invention and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
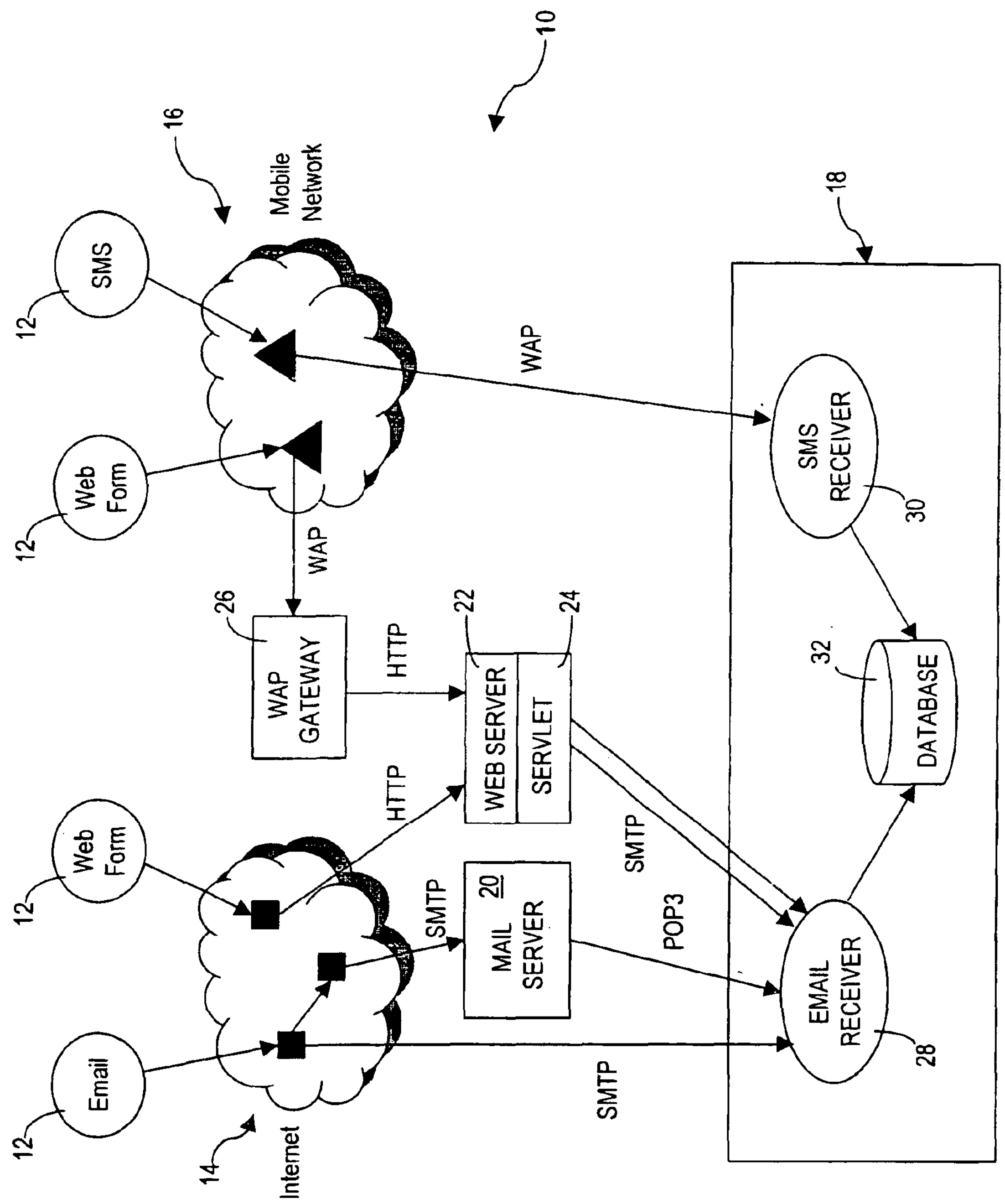
FIG. 1 is a schematic view of a communications network including a electronic message processing system.

With reference to FIG. 1 of the drawings, there is shown, generally indicated at 10, a communications network for the transmission of electronic messages 12. The network 10 includes a global computer network 14, such as the Internet, and a mobile telephone network 16 but, in general, may include any computer network and/or telecommunications network, including WAN, LAN or MAN networks. The electronic messages 12 typically take the form of, for example, e-mails, Web-page forms, SMS (Short Message Service) text messages, as commonly used by mobile telephones, or the like. It will be understood that the present invention is not limited for use with any particular such type or types of electronic messages.

The electronic messages 12 are transmitted across the communications network 10 in conventional manner using, for example, a mail server 20, Web server 22, servlet 24 and/or WAP (Wireless Application Protocol) gateway 26, as appropriate, and using conventional transmission protocols such as, WAP, HTTP (Hyper Text Transfer Protocol), SMTP (Simple Mail Transfer Protocol), POP (Post Office Protocol), or other suitable protocol. It will be understood that the invention is not limited to use with any particular transmission means or protocols.

The electronic messages 12 are received by a message processing system 18 which may reside, for example, on an organization's computer system (not shown) or an ASP's computer system (not shown). The message processing system 18 includes means for receiving electronic messages in conventional manner which, in the example of FIG. 1, includes an e-mail receiving module 28, an SMS receiving module 30 and a database 32 for storing received messages 12.

In the example illustrated in FIG. 1, the e-mail receiver 28 is arranged to receive e-mails in two ways. The first is directly from an ISP (Internet Service Provider) using SMTP, the second is via the mail server 20 using POP3. The e-mail receiver 28 is further arranged to receive Web-page form messages through the web server 22. Web-page form messages may be considered as structured e-mails which call the servlet 24 in the web server 22 which in turn converts the Web-page form content into an e-mail which is subsequently sent to the e-mail receiver 28 using SMTP.

Web-page forms from the mobile network 16 are transmitted using a WAP protocol stack to the WAP gateway 26. The WAP gateway 26 converts the Web-page form into an HTTP request, which is then processed by the web server 22 and servlet 24 as described above. SMS messaging from the mobile network 16 is conveniently transmitted using WAP to the SMS receiver 30.

Thus, the e-mail receiver 28 and the SMS receiver 30 are arranged in conventional manner to support the appropriate transmission protocols which, in the example of FIG. 1, are SMTP and POP3 for the e-mail receiver 28, and WAP (SMPP) for the SMS receiver.

The communications network 10 of FIG. 1 is given by way of example only to provide a typical context for the invention and is not limiting to the invention.

Figure 2:
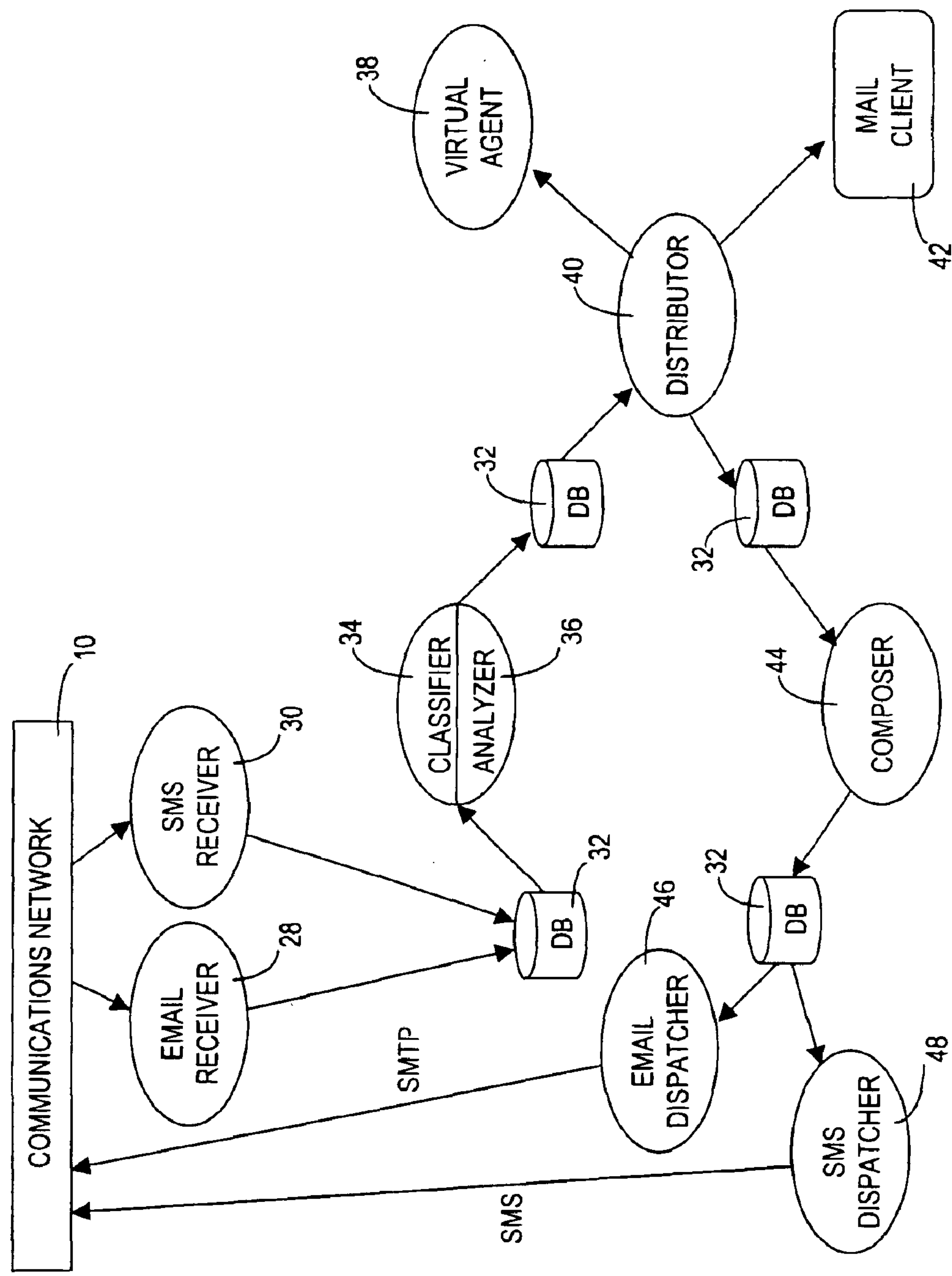
FIG. 2 is a more detailed schematic view of the electronic message processing system of FIG. 1.

Referring now to FIG. 2, the message processing system 18 is shown in more detail. Electronic messages 12 received by the e-mail receiver 28 and SMS receiver 30 are stored in database 32. A classification module 34, or classifier, retrieves each message 12 from the database 32 in turn. The primary function of the classifier 34 is to classify, or categorize, each message 12 into one or more categories depending on the content of the message 12. To this end, the classifier 34 is associated with, or includes, a text analyzer 36, for example the IBM Mail Analyzer and is further associated with, or includes, a rule engine.

Once classified (or categorized), each message is returned to the database 32 by the classifier 34 together with the determined classification information and, preferably, with information as to where the message should be routed in view of its classification. For example, messages 12 falling within certain categories may require to be dealt with by a human agent (not shown) with particular skills, while messages 12 falling within other categories may be dealt with automatically by a virtual agent 38.

A distributor module 40, or distributor, retrieves the categorized messages and distributes them either to the virtual agent 38 or a mail client 42, according to the respective categorization and/or routing information. The virtual agent 38 includes one or more software routines which automatically generate an appropriate response to a message 12 according to its categorization information. The mail client 42 provides the message 12 to a human operator, or agent, who then prepares an appropriate response. Once a final response is prepared, the distributor 40 marks the response as complete and causes it to be stored in the database 32. FIG. 2 only shows one mail client 42 and one virtual agent 38 although in practice there may be a plurality of each.

A composing module 44, or composer, retrieves responses from the database 32 that are marked as complete and composes a respective response message (not shown) for reply to the originator (not shown) of the respective received message 12. The composer 44 typically fulfils any attachment requirements as well as adding the appropriate Internet, or other, protocol information. Each composed response message is then returned to the database 32.

An e-mail dispatch module 46, or dispatcher, retrieves from the database 32 the composed response messages which are destined to be transmitted by e-mail and conveniently dispatches them to an ISP (not shown) using SMTP. An SMS dispatch module 48, or dispatcher, retrieves from the database 32 the composed response messages which are destined to be transmitted as SMS messages and dispatches them to the mobile network 16 using SMPP protocol.

Conveniently, the modules of FIG. 2 take the form of CORBA (Common Object Request Broker Architecture) modules, or servers written, for example, in the Java programming language. Each module may reside on a single computer or may be distributed across a computer system, as is convenient. The e-mail receiver 28, SMS receiver 30, virtual agent 38, mail client 42, composer 44, e-mail dispatcher 46 and SMS dispatcher 48 are generally conventional in configuration and operation and are not limiting to the present invention.

The text analyzer 36 is of the type which is capable of generating multiple categories for a given message. IBM'S mail analyzer is an example of such a text analyzer. One aspect of the present invention is concerned with the arrangement and interaction of the classifier 34 and the distributor 40 for dealing with messages that fall within more than one category, as is now described in more detail.

When an electronic message is processed by the text analyzer 36, the text analyzer 36 applies, in conventional manner, a set of rules to the content of the electronic message in order to determine the nature of the message. In this way, the text analyzer 36 is able to classify, or categorise, the electronic message according to its content. Some messages may include more than one type of question or request and may therefore fall into more than one different class or category. For example, a customer (not shown) of a banking organization may send in an e-mail message which comprises both a balance enquiry and a request for a funds transfer, each of which may be deemed to fall in a respective different category. The text analyzer 36 is therefore arranged to generate one or more categories for each message that it processes, depending on the content of each message. The text analyzer 36 is further arranged to assign to each category that it generates, an indication of the level of confidence it has that the categorisation is correct. The confidence level is typically expressed as a percentage.

Figure 4:
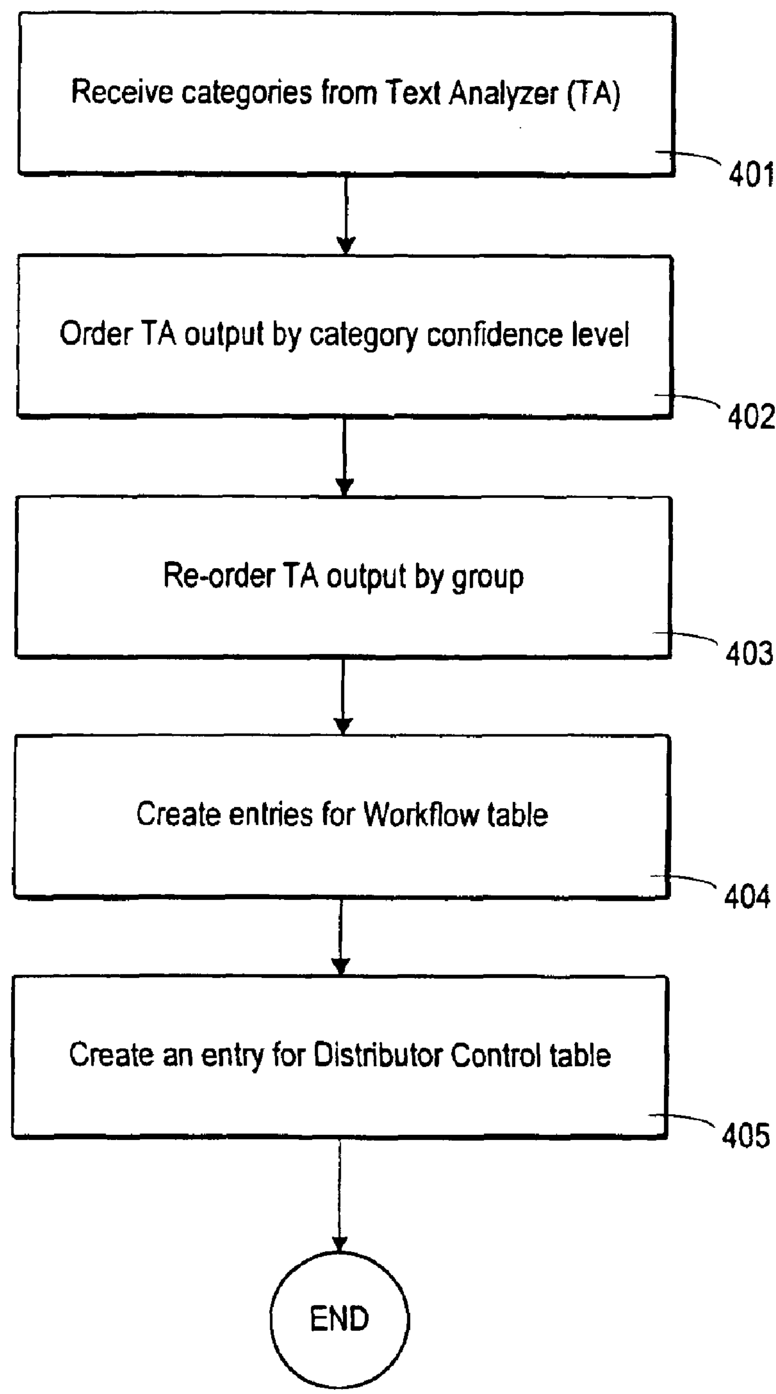
FIG. 4 is a flow chart illustrating the operation of a classifier, in accordance with the present invention, included in the system of FIG. 1.

With reference now to FIG. 4, the classifier 34 is arranged to receive, for each electronic message, the or each category generated by the text analyzer 36 (module 401). At module 402, the classifier 34 arranges the or each category generated by the text analyzer 36 in order of confidence level. Table 1 illustrates an example where for a given electronic message (not shown), the text analyzer 36 generates a set of five categories, namely categories 1, 4, 5, 6, 8, in which it deems that the message belongs. Each category is associated with a respective confidence level expressed as a percentage.

TABLE 1

| CATEGORY | CONFIDENCE LEVEL | GROUP |
|---|---|---|
| 6 | 98% | A |
| 4 | 87% | C |
| 1 | 86% | B |
| 5 | 73% | C |
| 8 | 64% | A |

TABLE 2

| ORDER | CATEGORY | GROUP |
|---|---|---|
| 1 | 6 | A |
| 2 | 8 | A |
| 3 | 4 | C |
| 4 | 5 | C |
| 5 | 1 | B |

Figure 7:
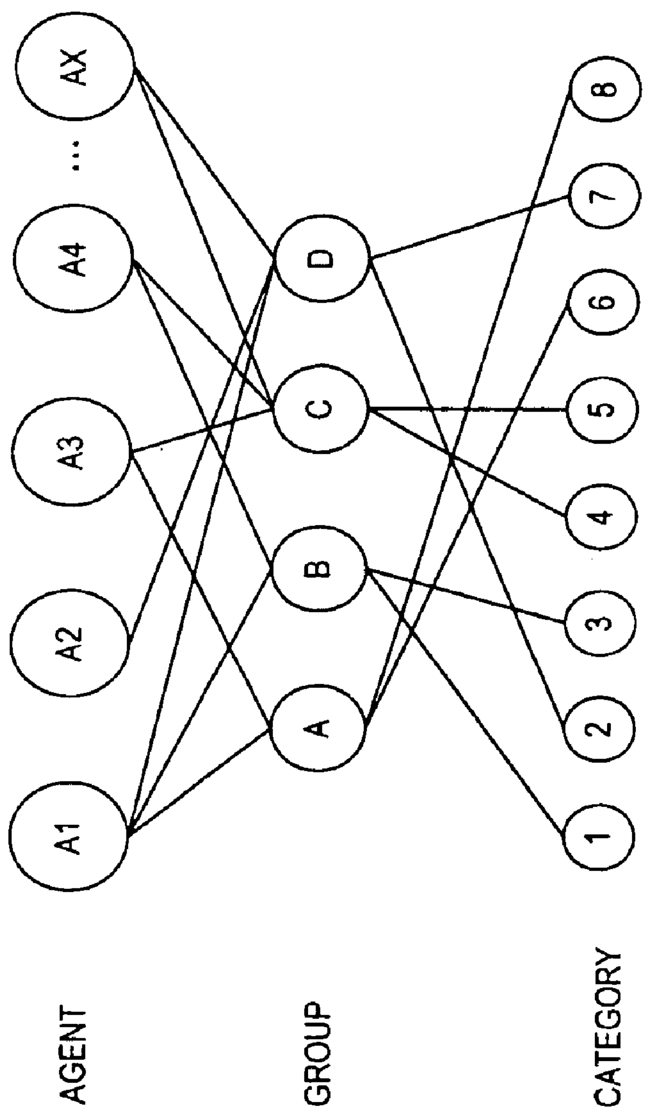
FIG. 7 is a schematic representation of electronic message categories and groups arranged for use with the present invention.

In the preferred embodiment, the categories are further arranged in groups and a group may embrace more than one category. An example of this arrangement is given in FIG. 7 in which categories 6 and 8 are defined as belonging to group A, categories 1 and 3 are defined as belonging to group B and so on. FIG. 7 is a simplistic example in which there are only 8 categories and 4 groups in total. In practice there may be, for example, hundreds of categories distributed amongst tens of groups. While the arrangement of categories into groups is not essential, it is preferred since it simplifies the routing of messages to agents particularly in cases where there are a relatively large number of categories.

In Table 1, the categories are arranged in decreasing order of confidence level and each category is further associated with its respective group which, in the present case, is either A, B or C. Table 1 is the result of the classifier's activity under module 402.

At module 403, the classifier 34 re-orders the generated categories according to both group and confidence level. This is illustrated in Table 2 where category 6, being the category having the highest confidence level, is placed at the top of the table. Category 8 is placed next in Table 2 as it is also in group A but has a lower confidence level than category 6. The third entry in Table 2 is category 4 which has the next highest confidence level after category 6 but is in group C rather than group A. Category 5 is positioned next in Table 2 as it belongs to the same group as category 4 but has a lower confidence level and, finally, category B takes up last position in the table. When the categories are so ordered, they are each assigned a respective order number or sequence number. Thus, a given electronic message is associated with a set of one or more categories which are ordered in a sequence according to the level of confidence with which each category has been assigned and, preferably, also according to the group into which each category falls, each category in the sequence having an order number or sequence number which identifies its position in the sequence.

It will be understood that there may be any number of different categories and/or groups. The illustrations given in Table 1 and 2 and FIG. 7 show only a simplistic example where there are eight categories and four groups.

Figure 3:
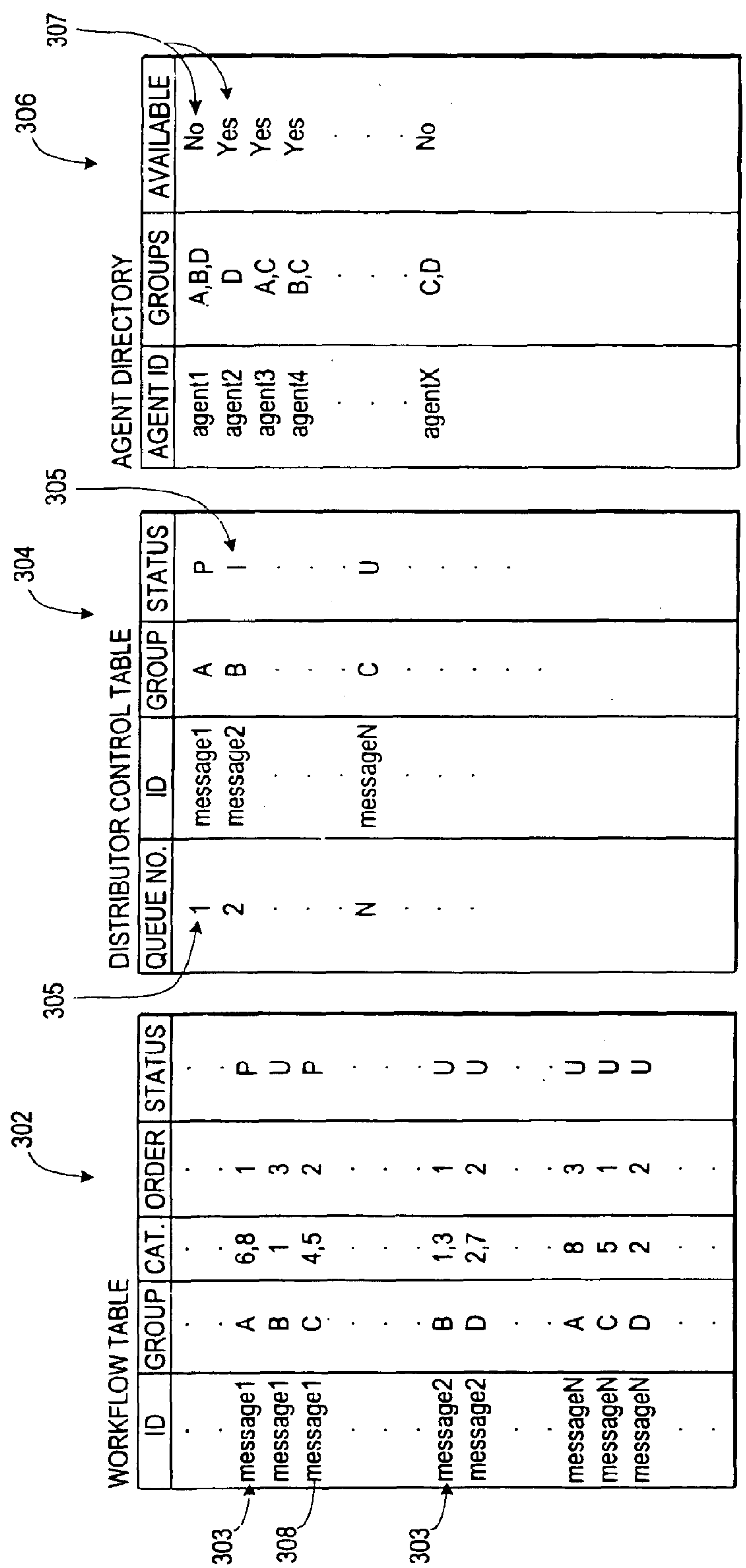
FIG. 3 is a schematic representation of data tables, arranged in accordance with the present invention, held within a database of the electronic message processing system of FIG. 1.

With reference now to FIG. 3, the database 32 includes a first set of data records, hereinafter referred to as the workflow table 302, each data record, or entry 303, including a message identification element (in the "ID" column of the workflow table 302), a group identifier (in the "GROUP" column in workflow Table 302), one or more category identifiers (in the "CAT" column in table 302) a sequence number identifier (in the "ORDER" column in workflow table 302) and a status indicator (in the "STATUS" column in workflow table 302).

It will be understood that the workflow table entries 303 need not necessarily include both a group identifier and a category identifier. In general, each workflow table entry should include a message class, or category, identifier or other means suitable for determining to which agent the corresponding message should be routed, or distributed. Thus, the database 32 stores, in respect of each electronic message to be distributed, a set of one or more message classes into which the respective electronic message is deemed to belong. The arrangement of FIG. 3 (i.e. the inclusion of both group and category identifiers) is preferred. As will be understood from the following description, the group identifier serves as a means for determining to which agent the corresponding message should be distributed, or routed, while the, or each, category identifier determines how the agent should respond to the message.

Referring again to FIG. 4, at module 404, the classifier 34 creates an entry 303 to the workflow table 302 for each group generated by the text analyzer 36 for a given message. For example, the message for which Table 2 is generated is designated with the message identifier message1. The classifier 34 thus generates three workflow table entries 303, each including the message identifier message1, a respective group identifier, one or more respective category identifiers, a respective sequence number and a respective status identifier. When the workflow table entries 303 are first created by the classifier 34, they are each given a status identifier which indicates that the entry 303 has not yet been processed by the distributor 40. In the present example the status identifier "UU" is used to indicate an unprocessed workflow table entry 303, while the status identifier "P" is used to indicate that the workflow table entry 303 has been processed by the distributor 40.

The classifier 34 creates one or more workflow table entries 303 for each message that it receives and processes (classifies). In FIG. 3, the workflow table 302 contains entries 303 for a plurality of messages, message1 to messageN. In FIG. 3, the entries 303 are shown to be ordered according to message identifier, but this need not necessarily be the case.

The database 32 further includes a second set of data records, hereinafter referred to as the distributor control table 304. The distributor control table 304 comprises a plurality of data records, or entries 305, each relating to a message, or part-message, which requires distribution to an agent by the distributor 40. In the present example, the entries 305 are arranged in queue order i.e. the order in which they are to be processed by the distributor 40. Each distributor control table entry 305 includes a queue number (which may conveniently be allocated on a first-come-first-served basis), a message identifier (ID) and a class identifier. It will be understood that order in which the entries 505 in the distributor control table 304 are processed, or distributed, by the distributor 40 need not necessarily be on a first-come-first-served basis and will depend on the distribution policy being implemented by the distributor (for example some groups may be given priority over others). The distributor control table 304 therefore represents a list, conveniently in queue order, of messages or part-messages which are to be processed, i.e. distributed, by the distributor 40. Each entry 505 further includes a status indicator for indicating whether the entry 505 is unprocessed (U), processed (P) or in progress (I).

Referring again to FIG. 4, at module 405, the classifier 34 creates a distributor control table entry 305 for each message that it classifies. In the preferred embodiment, the classifier 34 creates only a single distributor control table entry 305—corresponding to the group which it has placed first in the sequence of categories—for each message. Thus, in the example of Table 2, the classifier 34 creates a single distributor control table entry 305 corresponding to group A. The control table entry 305 comprises the message identifier message1, a group identifier for group A and two category identifiers, one for category 6 and one for category 8. Thus, the respective sequence numbers or order numbers serve as a priority identifier as they indicate the relative priority of table entries 303 which relate to a given message.

The database 32 further includes a directory 306 of one or more agents that are available for selection by the distributor 40 and to which the distributor 40 may distribute or transmit a given electronic message for processing. The agent directory 306 includes a data record, or entry 307, for each agent, each entry 307 including an agent identifier (Agent ID), an indication of the capability of the agent which, in the preferred embodiment, comprises identification of the group (s) that the agent can deal with, and an indication of whether or not the agent is currently available to the distributor 40. This is illustrated in FIG. 7, where Agent 1 (A1) can deal with groups A, B and D, Agent 2 (A2) can deal with group D only, and so on.

Figure 5:
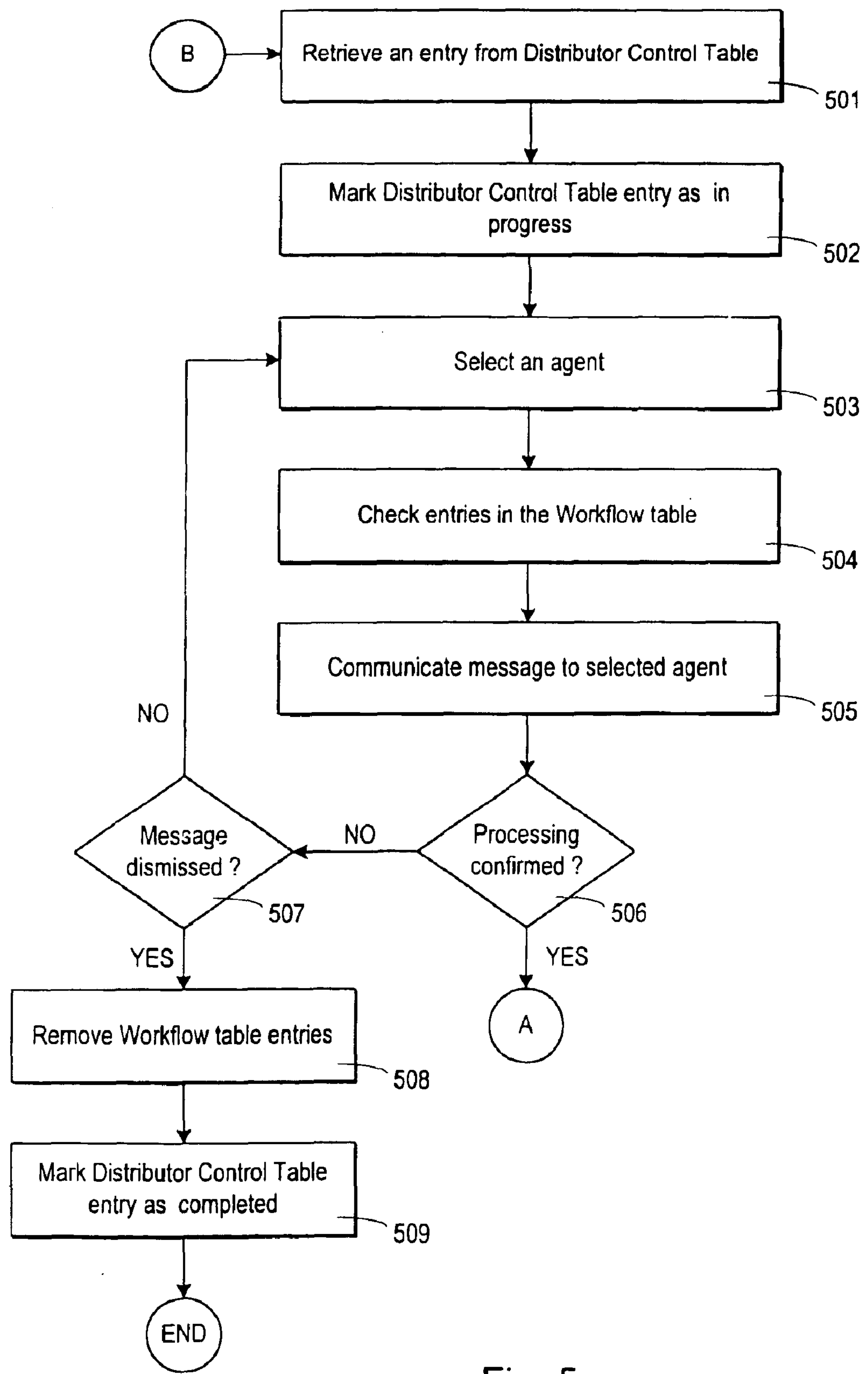
FIG. 5 is a flowchart illustrating the operation of a distributor, in accordance with the present invention, included in the system of FIG. 1.
Figure 6:
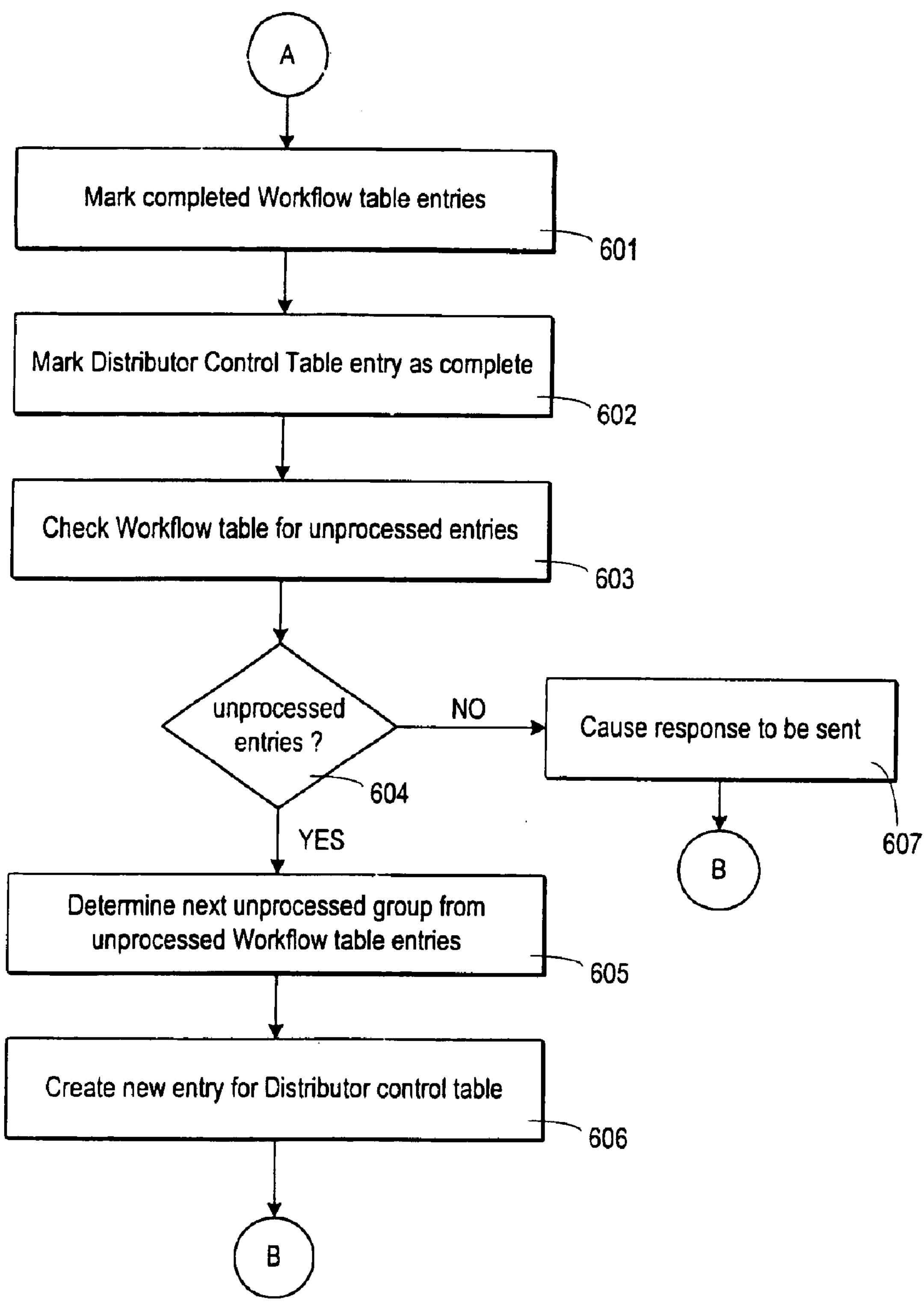
FIG. 6 is a continuation of the flowchart of FIG. 5.

Referring now to FIGS. 5 and 6, the operation of the distributor 40 is now described. At module 501, the distributor 40 retrieves the distributor control table entry 305 which is to be distributed next which, in the present example, is the one which is top of the queue.

At module 502, the distributor 40 marks the retrieved distributor control table entry 505 as being in progress. This is achieved by setting the respective status identifier to "I".

At module 503, the distributor 40 refers to the agent directory 306 and selects an agent that has the capability to process the group which is stipulated in the retrieved distributor control table entry 305, and which is currently available i.e. is not otherwise engaged, or absent.

The distributor 40 also determines from the agent directory 306 which other (if any) groups the selected agent can deal with. Then, at module 504, the distributor refers to the workflow table 302 to determine whether or not there are any further workflow table entries 303 for the current message being processed i.e. the message which corresponds to the retrieved distributor control table entry. In particular, the distributor 40 determines if there are any further workflow table entries 303 for said message which fall in a group that the selected agent can deal with.

By way of example, and with reference to FIG. 3, the distributor 40 retrieves the first (Queue No.1) distributor control table entry 305 from the distributor control table 304. The distributor 40 is able to determine from the retrieved distributor control table entry 305 that the message to which the control table entry relates is message1 and that message1 contains at least one query/request falling into group A. The distributor 40 then refers to the agent directory 306 to select an available agent who is capable of dealing with messages falling within group A. From the agent directory 306, the distributor 40 determines that Agent1 is capable of dealing with group A but that Agent1 is not currently available. The next available agent who is able to deal with group A is Agent3. The distributor 40 then selects Agent3 to deal with message1. Before assigning message1 to Agent3, the distributor 40 refers to the workflow table 302 to determine if there are any further workflow table entries 303 for message1 which Agent3 is also capable of dealing with. In the present example, the workflow table 302 includes one further entry 308 for message1, in which entry 308 message1 is classified in group C. The distributor 40 knows from the agent directory 306 that Agent3 is also capable of dealing with group C.

At module 505, the distributor 40 communicates the message corresponding to the retrieved distributor control Table entry 305 (in the present example message1) to the selected agent (in the present example Agent3), noting which group(s) the selected agent is able to process.

Conveniently, to communicate the message to the agent, the distributor 40 communicates to the agent's mail client 42 the message identifier and a list of the or each category that the agent is expected to deal with. The mail client 42 is then able to retrieve the message from the database 32 for rendering to the agent. In the example of message1, the distributor 40 communicates to the mail client 42 that the agent is to deal with message1 in categories 4, 5, 6 and 8.

Advantageously, the mail client 42 is also provided with a respective set of one or more standard responses, or replies, for each category. These standard responses are conveniently pre-prepared by the organization operating the message processing system 10 and stored locally to the mail clients 42.

Thus, when the agent's mail client 42 receives the category information from the distributor 40, it generates a suggested reply to the customer containing all of the standard responses which correspond to the relevant category(s). The mail client 42 then renders the message to the agent with its suggested response. The agent can then review the message and amend the suggested response as appropriate. It can thus be seen that the group information in the workflow table 302 and distributor control table 304 determine how a message (or part-message) is routed or distributed, while the category information determines what response is made by the agent.

Conveniently, the mail client 42 at which the agent operates is arranged to allow the agent to signal to the distributor whether or not a message is processed, unprocessed and/or dismissed.

When the selected agent has finished processing the message that has been distributed to him, the agent signals to the distributor 40 that he has finished with the message. The mail client 42 at which the selected agent operates, is arranged then to cause the agent's response to be returned to the database 32.

At module 506, the distributor 40 checks whether or not it has received a signal from the selected agent indicating that the message has been processed. If no such signal is received by the distributor 40, or if the selected agent sends an alternative signal indicating that the message has not been processed, then the distributor proceeds to module 507 in order to establish whether or not the message has been dismissed by the selected agent.

If, at module 507, the distributor 40 determines that the message has not been processed by the selected agent, then the distributor 40 returns to module 503 in order to select an alternative agent to send the message. If, at module 507, the distributor 40 determines that the message has been dismissed by the selected agent, then the distributor 40 refers again to the workflow table 302 and removes all of the workflow table entries 303 which relate to the dismissed message (module 508). At module 509, the distributor 40 marks the distributor control table entry as completed, or processed.

If, at module 506, the distributor 40 determines that the selected agent has processed the message, then the distributor 40 proceeds to module 601 (FIG. 6).

At module 601, the distributor 40 refers to the workflow table 302 and updates the respective status indicator of each entry 303 which relates both to the message which has just been processed by the selected agent and to the, or each, group which said selected agent is capable of processing. It does this by compairing the entries in the agent directory 306 with the group identifiers in the workflow table 302. In the example of FIG. 3, the distributor 40 updates the status identifiers of the workflow table entries 303 for message1 in group A and in group C. This is shown in FIG. 3 by means of the letter 'P' in the status column, rather than the letter 'U'.

At module 602 the distributor 40 marks the distributor control table entry 505 as complete, or processed (P).

At module 603 the distributor 40 checks the workflow table 302 for further entries 303 which relate to the same message that has just been processed by the selected agent but for which the respective status indicator shows that that particular entry 303 is unprocessed. In the example of FIG. 3, the workflow table 302 includes a further entry for message1 in group B which has the letter 'U' in the status column indicating that it is unprocessed.

If at module 604, the distributor 40 determines that further unprocessed workflow table entries 303 do exist for said message, then the distributor 40 proceeds to module 605. At module 605 the distributor 40 determines which of the further unprocessed workflow table entries 303 has been ordered as the highest in priority i.e. which has the lowest sequence number or order number. In the example of FIG. 3, the workflow Table entry 303 for message1 in group B is the only further entry 303 for message1 and so automatically enjoys highest priority. However, should there be a further entry 303 for message1 in, say, group D which were assigned order number 4, then the distributor to 40 would select the entry 303 in group B in preference over said hypothetical group D entry since the group B entry has a lower order number i.e. 3.

At module 606, the distributor 40 creates a new distributor control table entry 305 for said next, or highest priority, unprocessed workflow entry 303. In the example of FIG. 3, the distributor 40 creates a new distributor control table entry (not shown) for message1 in group B. In the present example the distributor 40 places said new distributor control table entry in queue order i.e. in the case where there are currently N entries already in the distributor control table 304, said new distributor control table entry is placed at queue number N+1.

After module 606, control returns to module 501 (FIG. 5) whereupon the distributor 40 retrieves the next entry from the distributor control table 304. In the present example, the next distributor control table entry 305 is at number 2 in the queue and relates to message2 in group B. Modules 502 to 606 are repeated in respect of the newly retrieved distributor control table entry 305.

In this way, the distributor 40 makes its way through the distributor control table entries to 305 in queue order (or according to whatever other distribution policy is being implemented). In the present example, the distributor 40 will eventually encounter said new distributor control table entry at queue position N+1 in the distributor control Table 304. Thus, the distributor 40 once more attends to the processing of message1, although this time to process message1 in respect of those group(s) which were not dealt with by the previously selected agent. Thus, the distributor 40 causes the message to be rendered to a further agent, which agent has the ability to process messages which belong to one or more of said unprocessed message groups. The process continues until the message has been dealt with in respect of all message groups for which there is a capable agent.

In the present example, only those aspects of message1 which relate to group B are outstanding. Modules 502 to 602 are repeated for the respective distributor control table entry and, conveniently, Agent4 is selected on this occasion to deal with message1 as Agent4 has the capability to deal with group B. When module 604 is reached, the distributor 40 determines on this occasion that there are no further workflow table entries for message1. The distributor 40 then proceeds to Module 607 in the assumption that the processing of message1 is complete. At Module 607, the distributor causes message, together with the response(s) prepared by Agent3 and Agent4, to be sent to the customer (not shown) from which message1 emanated. This is achieved in conventional manner via the composer 44 and, say, the e-mail dispatcher 46.

After module 607, the distributor 40 returns to module 501 to retrieve the next entry from the distributor control table 304.

The invention is described above in the context of a simple banking organization. It will be appreciated, however, that the invention is equally suitable for application other fields.

The invention is not limited to the embodiments described herein which may be modified or varied without departing from the scope of the invention.

What is claimed is:

1. An electronic message distributing apparatus for distributing electronic messages from a database to one or more agents, the database storing, in respect of each electronic message to be distributed, a set of one or more message classes into which the respective electronic message is deemed to belong, the distributing apparatus comprising:

means for determining, from said database, at least one message class in which an electronic message is deemed to belong;

means for selecting, from a directory of one or more agents, an agent that has a capability to process electronic messages that belong to said at least one message class by providing a response in respect of said at least one message class;

means for causing said electronic message to be rendered to said selected agent for processing thereby; and means for receiving from said selected agent a signal indicating that said electronic message is processed and that a response to said message is provided in respect of said at least one message class;

wherein, upon receipt of said signal, the distributing apparatus is arranged to determine, from said database, if said set includes one or more message classes in respect of which said electronic message is not processed and, in response to determining that said electronic message has not been processed in respect of one or more message classes in said set, is arranged to select a further agent to which to cause said electronic message to be rendered, which further agent has a capability to process messages which belong to one or more of said unprocessed message classes.

2. An electronic message distributing apparatus as claimed in claim 1, wherein each message class comprises a respective message group, each message group comprising one or more message categories.

3. An electronic message distributing apparatus as claimed in claim 1, including means for recording that said electronic message is processed in respect of said at least one message class.

4. An electronic message distributing apparatus as claimed in claim 1, wherein said agent directory includes, in respect of each agent, a set of one or more message classes in respect of which the respective agent has a capability of dealing with electronic messages, the distributing apparatus including means for comparing said selected agent message classes set with said set of message classes into which the electronic message is deemed to belong, whereupon receipt of said signal from said selected agent, the distributing apparatus determines that said electronic message is processed in respect of all message classes that are common to both of said message class sets.

5. An electronic message processing system for distributing electronic messages amongst a plurality of agents, the system comprising:

a database arranged to store, in respect of each electronic message to be distributed, a set of one or more message classes into which the respective electronic message is deemed to belong; and a directory of one or more agents, said directory including, in respect of each agent, a set of one or more message classes in respect of which the respective agent has a capability of dealing with electronic messages;

a distributing apparatus arranged to distribute electronic messages to one or more of said agents, the distributing apparatus comprising:

means for determining, from said database, at least one message class in which an electronic message is deemed to belong;

means for selecting, from said directory, an agent that has a capability to process electronic messages that belong to said at least one message class by providing a response in respect of said at least one message class;

means for causing said electronic message to be rendered to said selected agent for processing thereby; and means for receiving from said selected agent a signal indicating that said electronic message is processed and that a response to said message is provided in respect of said at least one message class;

wherein, upon receipt of said signal, the distributing apparatus is arranged to determine, from said database, if said set includes one or more message classes in respect of which said electronic message is not processed and, in response to determining that said electronic message has not been processed in respect of one or more message classes in said set, is arranged to select a further agent to which to cause said electronic message to be rendered, which further agent has a capability to process messages which belong to one or more of said unprocessed message classes.

6. An electronic message processing system as claimed in claim 5, wherein each message class comprises a respective message group, each message group comprising one or more message categories.

7. An electronic message processing system as claimed in claim 5, wherein said distribution apparatus includes means for recording that said electronic message is processed in respect of said at least one message class.

8. An electronic message processing system as claimed in claim 5, wherein the distributing apparatus includes means for comparing said selected agent message classes set with said set of message classes into which the electronic message is deemed to belong, whereupon receipt of said signal from said selected agent, the distributing apparatus determines that said electronic message is processed in respect of all message classes that are common to both of said message class sets.

9. An electronic message processing system as claimed in claim 5, wherein said database includes a first set of data records, said first data record set including one or more respective data records for each electronic message, each data record including means for identifying the respective message to which it relates; and means for identifying a respective message class in which said respective message is deemed to belong.

10. An electronic message processing system as claimed in claim 9, wherein each data record further includes status identifying means for indicating whether or not said respective message has been processed by an agent in respect of said respective message class, the distribution apparatus being arranged to cause said status identifying means to be updated in response to said signal from said agent.

11. An electronic message processing system as claimed in claim 10, wherein the distributing apparatus is arranged to update the status identifier of each data record that relates to the message processed by said selected agent and that relates to a message class in respect of which said selected agent is capable of processing messages.

12. An electronic message processing system as claimed in claim 9, wherein each data record further includes a priority identifier which indicates the relative priority of said data record in relation to the other data records held in said first data record set in respect of the same electronic message, the distributing apparatus being arranged to select an agent that has a capability to process electronic messages belonging to the message class identified in the data record which has highest priority and in respect of which message class the electronic message is not already processed.

13. An electronic message processing system as claimed in claim 12, wherein the relative priority of data records for an electronic message is determined by the level of confidence with which said electronic message is deemed to belong to the message category identified in the respective data records.

14. An electronic message processing system as claimed in claim 9, wherein message class identification means is a group identification means, where a group comprises one or more message categories.

15. An electronic message processing system as claimed in claim 14, wherein said data records further include means for identifying one or more categories to which said respective electronic message is deemed to belong.

16. An electronic message processing system as claimed in claim 9, including a classification apparatus, the classification apparatus comprising:

means for causing an electronic message to be classified into one or more message classes according to message content;

means for creating a respective data record, in said first data record set, for said one or more message classes.

17. An electronic message processing system as claimed in claim 16, wherein each message class is associated with an indication of the confidence level with which said message class is assigned to the message, said database further including a second set of data records, said second data record set including one or more respective data records for each electronic message, each data record including means for identifying the respective message to which it relates; and means for identifying a respective message class in which said respective message is deemed to belong, the classification apparatus being arranged to create a data record, in said second set of data records, in respect of the message class assigned to said electronic message with the highest level of confidence, the classification module being further arranged to include in the or each data record in said first set of data records an indication of the relative priority of each data record, wherein, the distributing apparatus is arranged to select a data record from said second data record set and to select an agent that is capable of processing messages belonging to the message class identified in said selected data record, the distributing apparatus being further arranged, upon receipt of said signal from said agent, to refer to said first set of data records and to create a new entry in said second set of data records in respect of the message class indicated in the date record in said first set which bears the highest priority and in respect of which message class the message has not been processed.

18. An electronic message processing system as claimed in claim 5, wherein said agent directory includes means for indicating the availability of each agent.

19. A message processing system as claimed in claim 5, wherein said electronic messages include electronic mail messages (e-mails).

20. A message processing system as claimed in claim 5, wherein said electronic messages include SMS (short message service) messages.

21. In an electronic message processing system for distributing electronic messages amongst a plurality of agents, the system comprising: a database arranged to store, in respect of each electronic message to be distributed, a set of one or more message classes into which the respective electronic message is deemed to belong; and a directory of one or more agents, said directory including, in respect of each agent, a set of one or more message classes in respect of which the respective agent has a capability of dealing with electronic messages, a method of processing electronic messages, the method comprising:

determining, from said database, at least one message class in which an electronic message is deemed to belong;

selecting, from said directory, an agent that has a capability to process electronic messages that belong to said at least one message class by providing a response in respect of said at least one message class;

causing said electronic message to be rendered to said selected agent for processing thereby;

receiving from said selected agent a signal indicating that said electronic message is processed and that a response to said message is provided in respect of said at least one message class;

determining, upon receipt of said signal, if said set includes one or more message classes in respect of which said electronic message is not processed;

selecting, in response to determining that said electronic message has not been processed in respect of one or more message classes in said set, a further agent to which to cause said electronic message to be rendered, which further agent has a capability to process messages which belong to one or more of said unprocessed message classes.

22. A method as claimed in claim 21, further including recording that said electronic message is processed in respect of said at least one message class.

23. A method as claimed in claim 21, further including comparing said selected agent message classes set with said set of message classes into which the electronic message is deemed to belong, and, upon receipt of said signal from said selected agent, determining that said electronic message is processed in respect of all message classes that are common to both of said message class sets.

24. A method as claimed in claim 22, wherein said database includes a first set of data records, said first data record set including one or more respective data records for each electronic message, each data record including means for identifying the respective message to which it relates; means for identifying a respective message class in which said respective message is deemed to belong; and status identifying means for indicating whether or not said respective message has been processed by an agent in respect of said respective message class, the method further including causing said status identifying means to be updated in response to said signal from said agent.

25. A method as claimed in claim 24, further including updating the status identifier of each data record that relates to the message processed by said selected agent and that relates to a message class in respect of which said selected agent is capable of processing messages.

26. A method as claimed in claim 24, wherein each data record further includes a priority identifier which indicates the relative priority of said data record in relation to the other data records held in said first data record set in respect of the same electronic message, the method further including selecting an agent that has a capability to process electronic messages belonging to the message class identified in the data record which has highest priority and in respect of which message class the electronic message is not already processed.

27. A method as claimed in claim 26, wherein the relative priority of data records for an electronic message is determined by the level of confidence with which said electronic message is deemed to belong to the message category identified in the respective data records.

28. An method as claimed in claim 24, wherein message class identification means is a group identification means, where a group comprises one or more message categories.

29. A method as claimed in claim 24, wherein the system includes a classification apparatus, the classification apparatus comprising means for causing an electronic message to be classified into one or more message classes according to message content; and means for creating a respective data record, in said first data record set, for said one or more message classes, wherein each message class is associated with an indication of the confidence level with which said message class is assigned to the message, said database further including a second set of data records, said second data record set including one or more respective data records for each electronic message, each data record including means for identifying the respective message to which it relates; and means for identifying a respective message class in which said respective message is deemed to belong, the method further including creating a data record, in said second set of data records, in respect of the message class assigned to said electronic message with the highest level of confidence;

including in the or each data record in said first set of data records an indication of the relative priority of each data record;

selecting a data record from said second data record set;

selecting an agent that is capable of processing messages belonging to the message class identified in said selected data record;

creating, upon receipt of said signal from said agent, a new entry in said second set of data records in respect of the message class indicated in the data record in said first set which bears the highest priority and in respect of which message class the message has not been processed.

30. A computer program product comprising computer program code stored on a computer usable storage medium for, when executed on a computer system, processing electronic messages in an electronic message processing system for distributing electronic messages amongst a plurality of agents, the system comprising: a database arranged to store, in respect of each electronic message to be distributed, a set of one or more message classes into which the respective electronic message is deemed to belong; and a directory of one or more agents, said directory including, in respect of each agent, a set of one or more message classes in respect of which the respective agent has a capability of dealing with electronic messages, a method of processing electronic messages, the method comprising:

determining, from said database, at least one message class in which an electronic message is deemed to belong;

selecting, from said directory, an agent that has a capability to process electronic messages that belong to said at least one message class by providing a response in respect of said at least one message class;

causing said electronic message to be rendered to said selected agent for processing thereby;

receiving from said selected agent a signal indicating that said electronic message is processed and that a response to said message is provided in respect of said at least one message class;

determining, upon receipt of said signal, if said set includes one or more message classes in respect of which said electronic message is not processed;

selecting, in response to determining that said electronic message has not been processed in respect of one or more message classes in said set, a further agent to which to cause said electronic message to be rendered, which further agent has a capability to process messages which belong to one or more of said unprocessed message classes.

* * * * *